Figure 9:
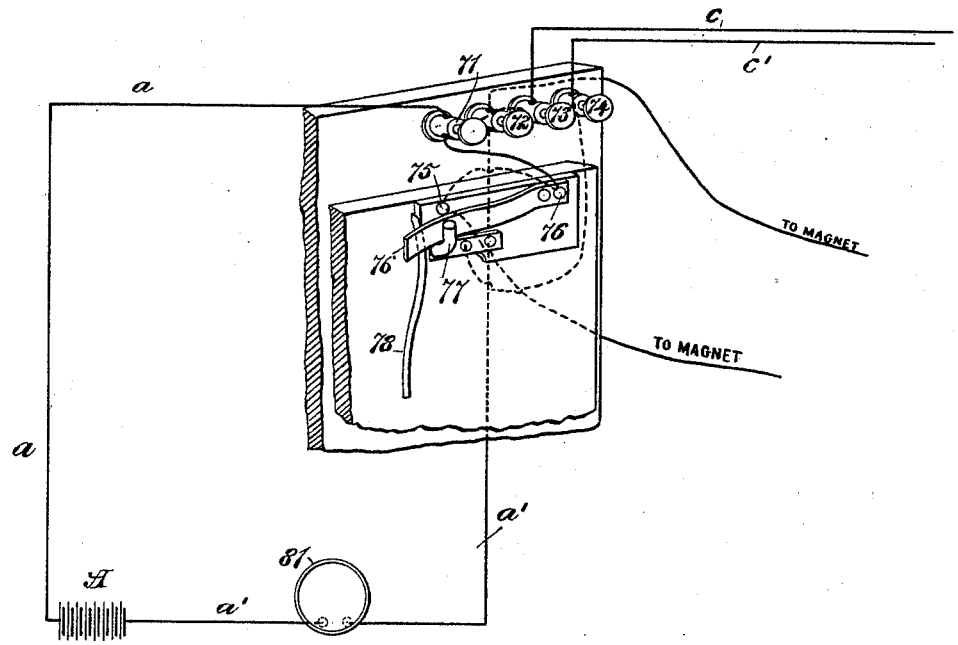

(No Model.) 3 Sheets—Sheet 1.
A. C. WINCH.
DEVICE FOR FEEDING AND WATERING LIVE STOCK.
No. 519,935. Patented May 15, 1894.
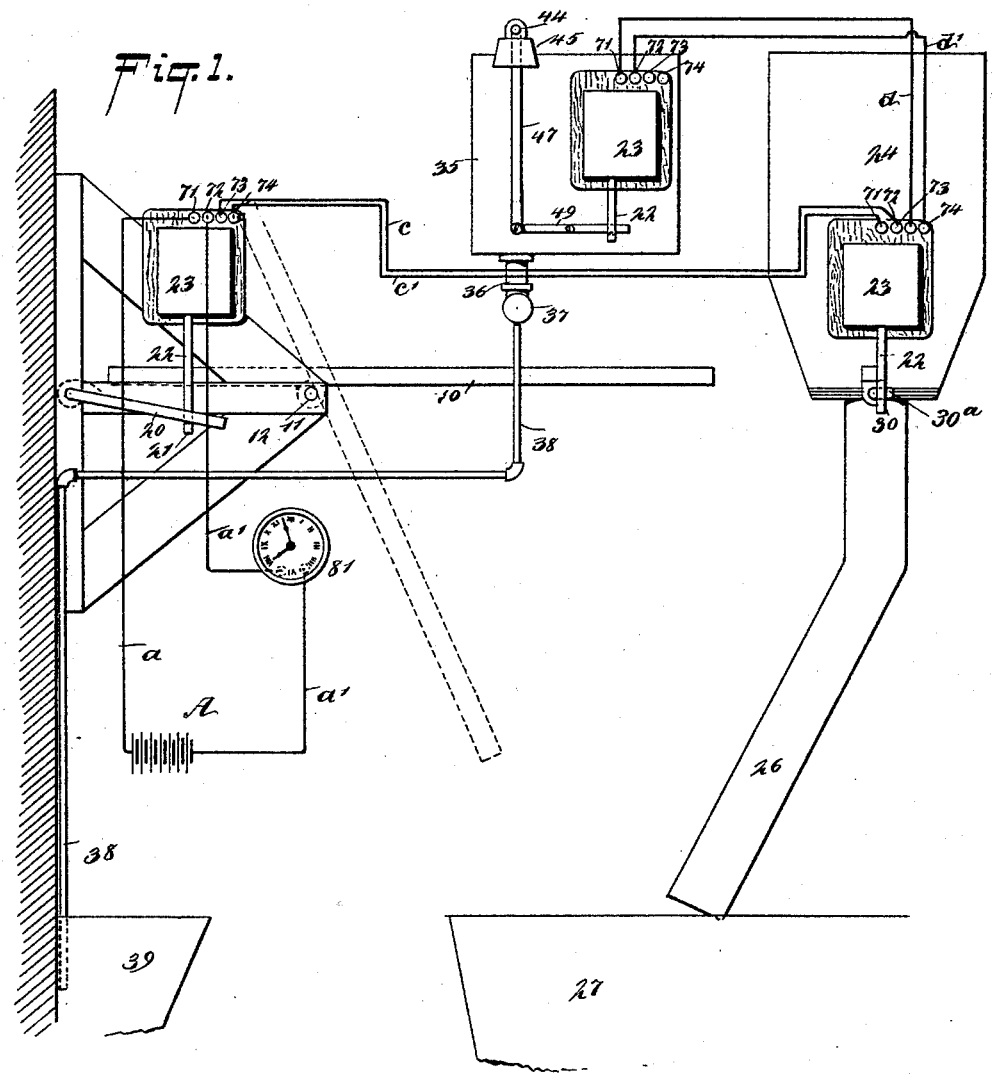
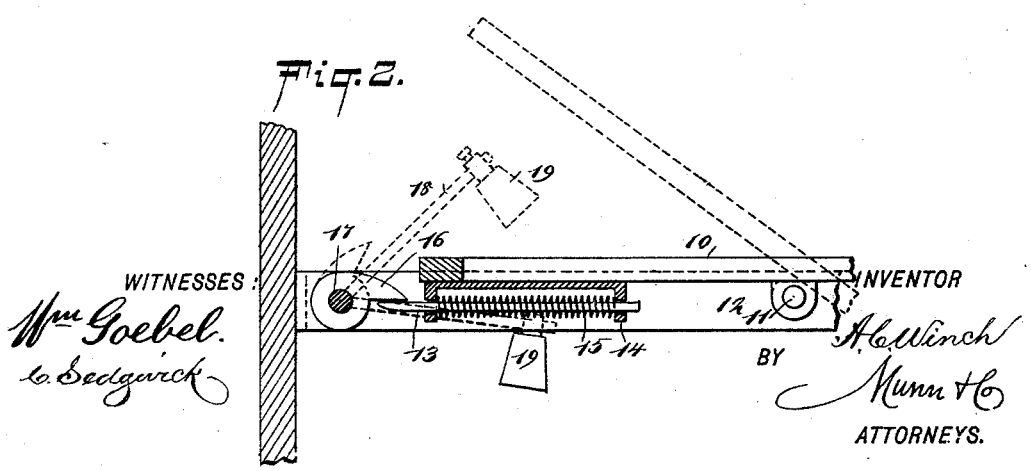
WITNESSES: Wm Goebel. C. Sedgwick
INVENTOR A. C. Winch BY Munn & Co ATTORNEYS.

(No Model.) 3 Sheets—Sheet 2.
A. C. WINCH.
DEVICE FOR FEEDING AND WATERING LIVE STOCK.
No. 519,935. Patented May 15, 1894.
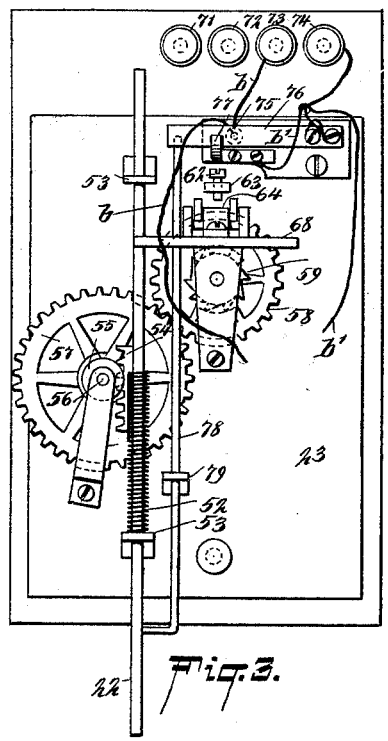
Fig.3.
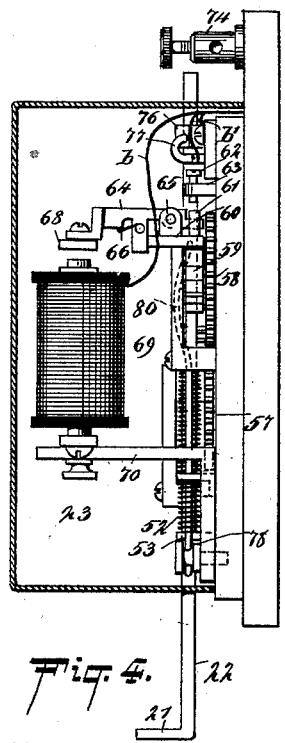
Fig.4.
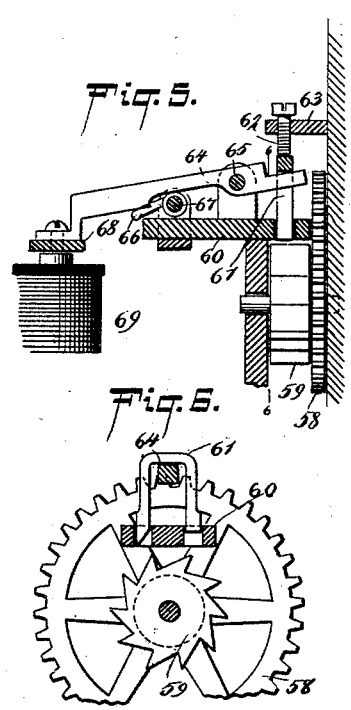
Fig.5.
Fig.6.
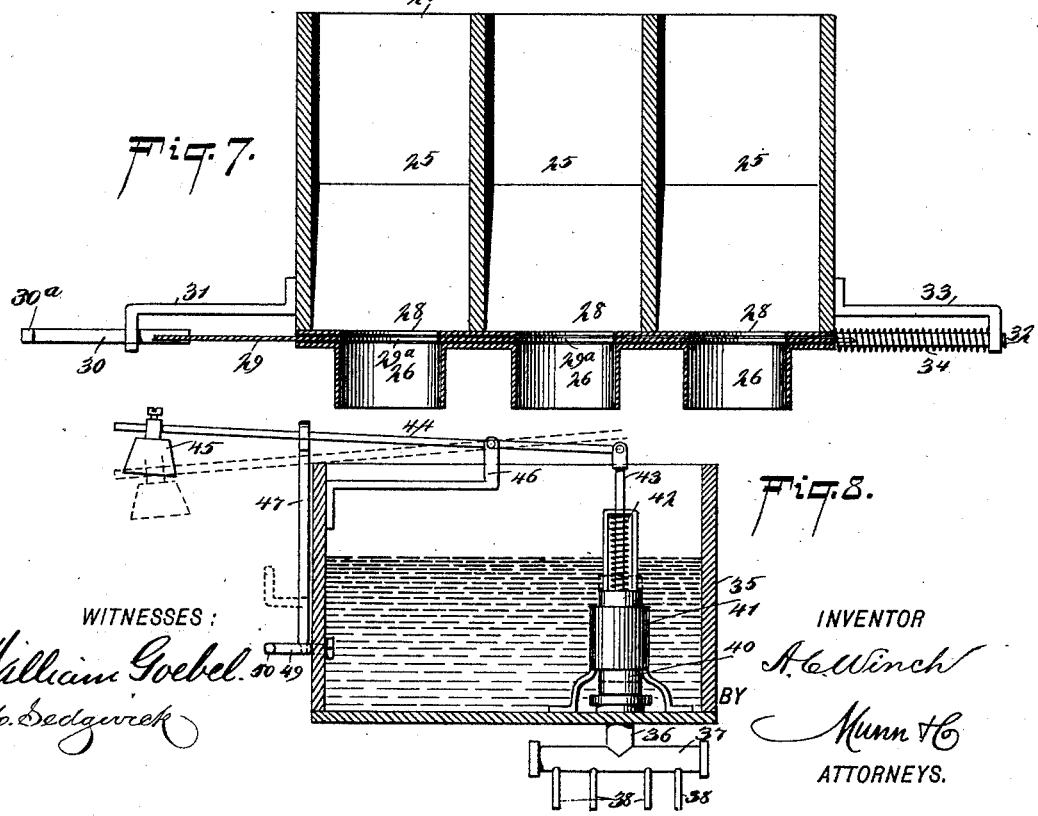
Fig.7.
Fig.8.
WITNESSES:
William Goebel
C. Sedgwick
INVENTOR
A. C. Winch
BY
Munn & Co.
ATTORNEYS.

(No Model.) 3 Sheets—Sheet 3.
A. C. WINCH.
DEVICE FOR FEEDING AND WATERING LIVE STOCK.
No. 519,935. Patented May 15, 1894.

WITNESSES:
William Goebel.
A. Lurcott.

INVENTOR
A. C. Winch.
BY Munn & Co
ATTORNEYS.

UNITED STATES PATENT OFFICE.

ARTHUR C. WINCH, OF SAXONVILLE, MASSACHUSETTS.

DEVICE FOR FEEDING AND WATERING LIVE STOCK.

SPECIFICATION forming part of Letters Patent No. 519,935, dated May 15, 1894.

Application filed April 17, 1893. Serial No. 470,642. (No model.)

*To all whom it may concern:*

Be it known that I, ARTHUR C. WINCH, of Saxonville, in the county of Middlesex and State of Massachusetts, have invented new and Improved Electrically-Operated Mechanism for Feeding and Watering Live Stock, of which the following is a full, clear, and exact description.

My invention is an improvement in the class of devices adapted for discharging feed for live-stock, when operated by releasing devices which are in turn controlled by suitable automatic mechanism or manually-operated devices. I prefer to employ electrically-operated releasing devices, and a time mechanism for closing the circuit, but a manually-operated circuit closer may be utilized if desired.

To this end, my invention consists in certain features of construction and combinations of parts, which will be hereinafter described and claimed.

Reference is to be had to the accompanying drawings, forming a part of this specification, in which similar figures and letters of reference indicate corresponding parts in all the views.

Figure 1 is a diagrammatic view, showing the general arrangement of the apparatus and the electrical connections of the feeding mechanism. Fig. 2 is a detail sectional view of the locking and releasing mechanism of the hay rack. Fig. 3 is a broken front elevation of the electrically-operated releasing mechanism. Fig. 4 is a sectional side elevation of the same. Fig. 5 is an enlarged detail view of the magnet-operated releasing lever and ratchet used in the locking and releasing box. Fig. 6 is a detail cross section on the line 6—6 in Fig. 5. Fig. 7 is a vertical section of the grain box from which grain is fed to the several mangers. Fig. 8 is a detail sectional view of the water tank from which water is supplied to the mangers. Fig. 9 is a detail perspective of the releasing mechanism, illustrating the electrical circuits.

For feeding hay to a manger a hay rack 10 is used, which is of a generally flat shape, and is pivoted at its ends, as shown at 11, so as to permit it to tilt and discharge its load, the rack being journaled in a suitable bracket 12, which is arranged at a convenient point above the manger. On the inner side of the rack 10, is a spring bolt 13, which is held in a suitable support 14, and is normally pressed outward by a spring 15, so as to engage a catch 16 on an oscillating shaft 17, this being journaled in the bracket 12, and having at one end a laterally-extending arm 18, carrying a weight 19, which is of sufficient heft to hold the catch 16 above the bolt 13, and to nearly support the loaded rack 10. At the other end of the shaft 17 is a crank 20, which extends into the path of the bent end 21 of the releasing and locking bar 22, which is held in a suitable case 23, and is operated by electrically-controlled mechanism hereinafter described, so that at a certain time it is raised and by being raised it lifts the crank 20, raises the catch 16, and permits the rack 10 to tip and discharge its load. A number of racks may be arranged in series and operated by one locking box and bar.

The grain is fed to the manger in a substantially similar way, and to this end, a box 24 is provided, which is shown in detail in Fig. 7, and which has a number of compartments 25, each being adapted to contain grain enough for one animal, and any number of these compartments may be provided. Leading from the bottom of each compartment is a pipe 26, which discharges into the manger 27. In the bottom of the grain box, and beneath each compartment, is a hole 28, registering with the pipe 26, and a slide 29 is arranged to move in the bottom of the grain box, this slide being provided with openings 29ª adapted to register with the holes 28 and pipes 26, so as to permit the grain to fall through the pipes, but when the slide is pushed to one side, the pipes are closed and the grain prevented from falling. The slide 29 is provided at one end with a shaft 30, which slides in a bracket 31 on the grain box, and at the other end with a shaft 32 sliding in a bracket 33, and on the shaft 32 is a spring 34, which normally pushes the slide into a position to open the holes and permit the grain to drop through the pipes.

To set the grain feeding device the slide 29 is pushed against the tension of the spring 34, so that the pipes 26 are closed, and it is held in this position by the locking and releasing bar 22, which is extended opposite a lug 30ª on the end of the shaft 30, and which by being raised at a certain time, permits the spring 34 to throw out the slide 29 and open the grain pipes. A locking and releasing box 23 is provided for the hay feeding, the grain feeding, and water-supplying devices.

The water is supplied to the mangers from a tank 35, which is arranged at a suitable elevation, and which has a discharge pipe 36 in the bottom connecting with a pipe 37, see Fig. 8, from which lead pipes 38, which discharge into suitable vessels 39 arranged in the stall or manger within reach of the animals to be watered. Above the pipe 36 is a pipe 40, which is held in a suitable casing 41, and is provided with the ordinary valve mounted on a stem 43, and pressed into a closed position by a spring 42. The valve mechanism is not shown in detail, as any valve operated by a vertically-movable stem may be used.

At the upper end of the stem 43, is pivoted a tilting lever 44, which at its outer end is provided with a weight 45 heavy enough to normally tilt the lever 44, raise the stem 43, and open the valve so as to permit the water to flow out through the pipes 36, 37 and 38. The outer end of the lever 44 is held raised so as to permit the closing of the valve by a pitman 47, which extends downward on the outer side of the tank, and is pivoted to a lever 49, which is fulcrumed near its center on the tank 35, and extends horizontally as shown in Fig. 1, the lever having an outward bend 50, to engage the locking bar 22. This lever 49 is prevented from tilting by the locking and releasing bar 22, which bears upon it, as shown in Fig. 1, but when the locking bar is released, the lever 49 being free, permits the weight 45 to drop and open the valve.

I do not claim in detail the construction of the water tank and valve, and the grain and hay supplying devices, as my invention lies chiefly in the locking and releasing mechanism which may be applied to any devices having a tripping lever and operated in the general way described. The locking and releasing bar 22 is normally pressed upward by a spiral spring 52, see Figs. 3 and 4, which spring rests upon the lower bracket or support 53 of the bar, and presses upward against a rack 54 carried by the bar. The bar slides freely in the brackets 53, which are arranged on a suitable support and near the upper and lower ends of the bar. The rack 54 engages a pinion 55 on a shaft 56, which extends horizontally adjacent to the bar 22, and on the shaft 56 is a gear wheel 57, which meshes with a smaller gear wheel 58 which runs adjacent thereto, and this gear wheel 58 carries a ratchet wheel 59, above which is a plate or bracket 60, and arranged to move through this bracket is a sliding pawl 61, shown clearly in Fig. 6, which pawl is in the form of a staple and is adapted to engage the ratchet wheel 59, and so hold the bar 22 in a fixed position and with the spring 52 pressed. The upward movement of the pawl 61 is limited by a screw 62 in a bracket 63, see Fig. 5. The pawl 61 is raised so as to release the ratchet wheel and the locking and releasing bar by a tilting lever 64, which is fulcrumed above the plate 60, as shown at 65, and which is normally pressed upward so as to permit the pawl to drop, by a spring 66 carried by a stud 67 on the plate 60. The outer end of the lever 64 is provided with an armature 68, which is actuated by a magnet 69 arranged beneath it and carried by a suitable support 70.

Each locking and releasing box is provided with the mechanism just described, and with binding posts 71, 72, 73 and 74. Each locking box is also provided with an automatic switch which is adapted to shunt or switch the current from one locking box to the next, so that the hay, grain and water supplying mechanisms may be operated in succession. This switch is shown in Figs. 3 and 4. A contact 75 is arranged adjacent to a spring 76, which normally rests against the contact and which is adapted to be forced outward against a second contact 77, which movement of the spring shifts the current as described presently. The spring switch 76 is forced from the contact 75 to the contact 77 by a switch bar 78, which is carried by the locking and releasing bar 22, and moves in a suitable guide 79. The switch bar 78 is bent outward near its upper end, as shown by dotted lines at 80 in Fig. 4, and when it rises behind the spring 76 it forces the latter outward against the contact 77, thus switching the current as will appear from the following description.

Some form of circuit closer is required, and I prefer to employ a clock 81 which, at a certain time is adapted to close the circuit, but which is not shown in detail, as any common form of circuit-closing clock may be used. The current is supplied from a battery A, or other source of electricity, and a wire $a$ leads from the battery to the binding post 71 of the locking and releasing box of the hay supplying device, and a wire $a'$ leads from the battery through the clock and to the binding post 72. The binding posts 71 and 72 connect with the magnet 69 of the first locking and releasing box, in the usual way, and from the magnet lead wires $b$ and $b'$, one of which connects with the contact 75 and the binding post 73, while the other connects with the contact 77 and the binding post 74. From the binding posts 73 and 74 lead wires $c$ and $c'$ to the binding posts 71 and 72 of the second locking and releasing box which controls the grain supplying apparatus, and from the binding posts 73 and 74 of this apparatus lead wires $d$ and $d'$, to the binding posts 71 and 72 of the third locking and releasing box which controls the water supply, and after this apparatus has been worked the circuit is broken.

The circuits described are operative, but it will be understood that they may be arranged in many different ways to accomplish the same result.

The apparatus operates as follows: The rack 10 is set in a horizontal position, with the spring bolt 13 beneath the catch 16, and is loaded with a suitable supply of hay. The locking bar 22 of the hay supplying device is pushed down so that the bent end 21 of it is beneath the crank 20 of the hay rack, and the locking bar is held in place by the pawl 61 as above described. The grain box is supplied with grain, which is prevented from falling, by the slide or valve 29, and this is held closed in the manner described by pushing the locking and releasing bar of its controlling box downward opposite the end of the shaft 30. In like manner the valve of the water supply tank is closed and held closed by pushing down its releasing and locking bar 22, which presses upon the upper side of the free end of the lever 49. The clock is set so as to close the circuit at the required time, and when this occurs, the magnet 69 of the first locking box being energized, pulls down the armature 68, tilts the lever 64 and lifts the pawl 61, which frees the ratchet wheel 59 and the gear mechanism connected therewith, thus permitting the spring 52 to lift the locking and releasing bar 22 and raise the crank 20, so as to free the bolt 13 and permit the hay rack 10 to tip. When the circuit is closed through the first locking box the current will pass through the magnet, and the box is short circuited so that the current passes through the wire b, the spring 76 and the wire b' back to the magnet; but when the bar 22 rises, it lifts the switch bar 78, which throws the spring 76 against the contact 77, and this causes the current to pass from the magnet through the wire b, the binding post 73, the wire c, the magnet of the second locking box on the grain supplying apparatus, and the wire b' and binding post 74 back to the magnet of the first locking box, and the action just described takes place when the controlling box of the grain supplying box is worked, and the water supplying apparatus is then set in motion. When the locking and releasing bar of the grain supplying device is raised, it frees the shaft 30, so that the spring 34 permits the slide 29 to move and open the grain pipes 26, so that the grain passes down to the manger, and when the bar 22 is lifted from the lever 49 of the water-supplying tank it opens the valve in the manner described, and permits the water to flow out through the pipes 38.

It will be seen that the entire apparatus is operated whenever the circuit is closed, and thus hay, grain and water are supplied to the stock, simultaneously.

Having thus described my invention, I claim as new and desire to secure by Letters Patent—

1. In a mechanism of the kind described, a series of automatic feed-discharging mechanisms, a like series of tripping devices and a series of magneto-electric mechanisms for simultaneously releasing said tripping devices, an open electric circuit which extends successively from one to the other of such releasing mechanisms, and a circuit-closer, all combined as shown and described.

2. In an apparatus of the kind described, the locking and releasing mechanism, comprising a spring-pressed locking and releasing bar held to slide in suitable bearings, a gear mechanism connected with the bar and provided with a ratchet wheel, a pawl to engage the ratchet wheel, and electrically-operated means for releasing the pawl, an electrical circuit, and time mechanism included therein substantially as specified.

3. In an apparatus of the kind described, the locking and releasing mechanism, comprising a spring-pressed slide bar having a rack thereon, a gear mechanism connected with the rack and provided with a ratchet wheel, a sliding pawl held to engage the ratchet wheel, a tilting lever to lift the pawl, an electro-magnet to actuate the lever, and an electric circuit and circuit-closer substantially as specified.

4. In an apparatus of the kind described, the locking and releasing mechanism, comprising a spring pressed slide bar, a gear mechanism connected therewith, a pawl and ratchet to lock the gear mechanism and bar, electrically-operated means for raising the pawl, a switch actuated by the movement of the slide bar, substantially as specified.

5. In an apparatus of the kind described, the locking and releasing mechanism, comprising a spring-pressed slide bar, a gear mechanism connected therewith, a ratchet wheel and pawl to lock the gear mechanism and bar, electrically-operated means for raising the pawl, and a switch actuated by the movement of the bar, the switch comprising oppositely-arranged contacts a circuit connecting the latter, a spring to move between the contacts, and a switch bar carried by the slide bar and arranged to engage the spring, substantially as specified.

6. In an apparatus of the kind described, the combination, with a locking and releasing bar held to slide in suitable supports and means for operating said bar, of a switch, comprising oppositely-arranged contacts, a circuit connecting the latter, a spring held to move between the contacts, and a switch bar carried by the slide bar and adapted to engage and move the spring, substantially as specified.

7. In an apparatus of the kind described, the combination of the tilting hay-rack having a spring bolt at one end, the oscillating shaft having a catch to engage the spring bolt, a crank on the shaft and an electrically-operated bar adapted to raise the crank and release the catch, substantially as specified.

8. The combination, with the water tank having a suitable discharge pipe and a vertically movable valve, of a tilting weighted lever connected with the valve to open the same, a second lever fulcrumed on the tank and connected with the tilting lever, and a vertically movable electrically-operated bar adapted to lock and release the second lever, substantially as specified.

ARTHUR C. WINCH.

Witnesses:
CHAUNCEY U. FULLER,
GUSTAVUS S. HEARD.